Nov. 14, 1950  J. C. CARLIN  2,529,593
LENGTH-MARKING APPARATUS
Filed July 9, 1946  3 Sheets-Sheet 1
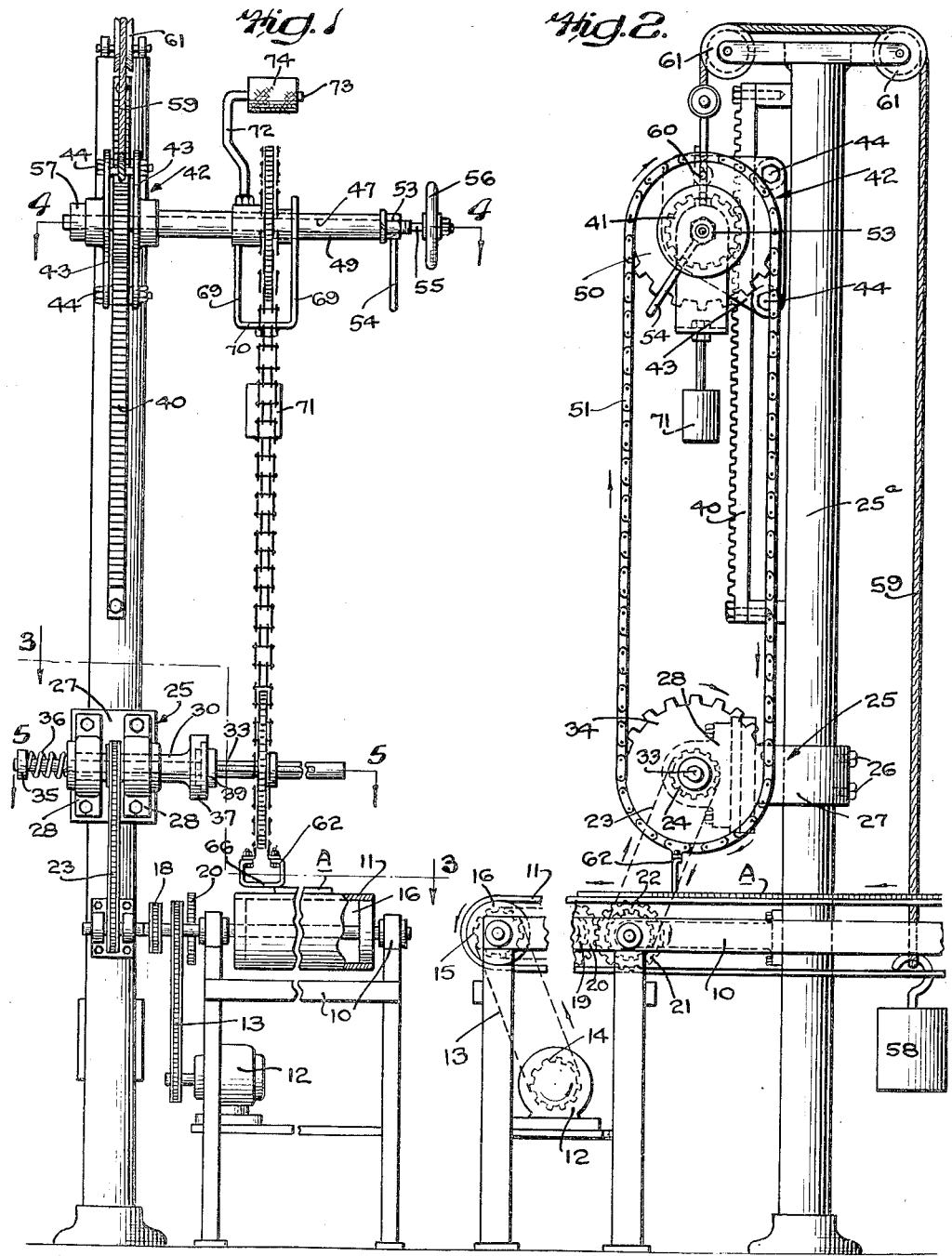
INVENTOR
JAMES C. CARLIN
BY Leon Idelson
ATTORNEY Nov. 14, 1950 J. C. CARLIN 2,529,593
LENGTH-MARKING APPARATUS
Filed July 9, 1946 3 Sheets-Sheet 2
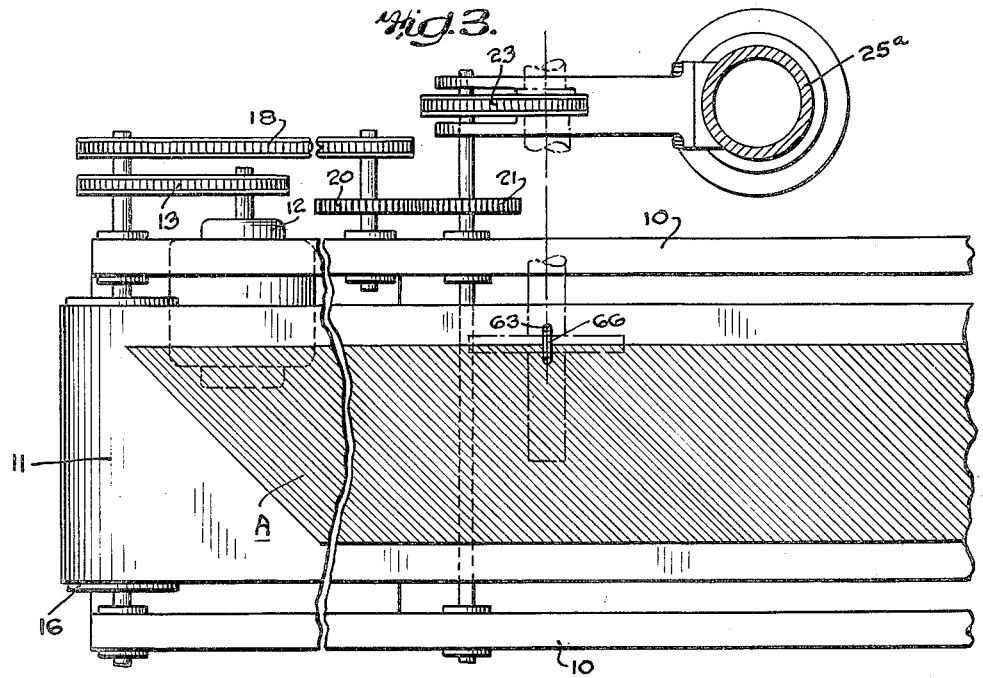
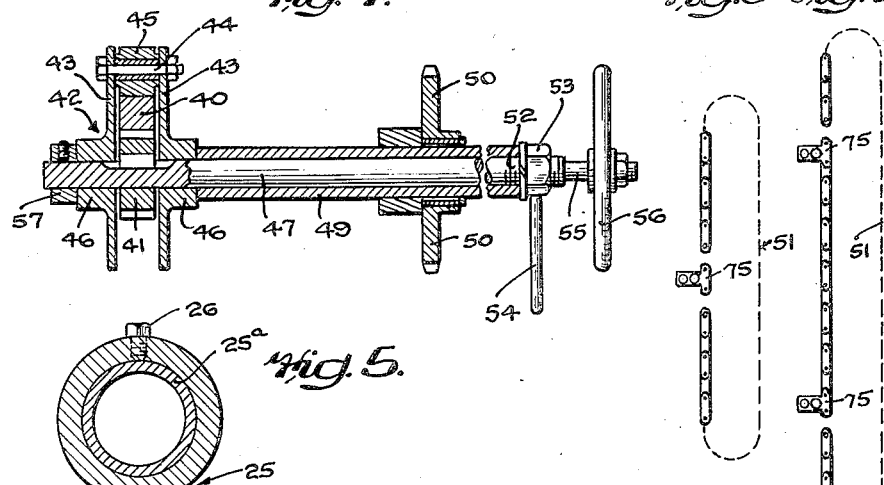
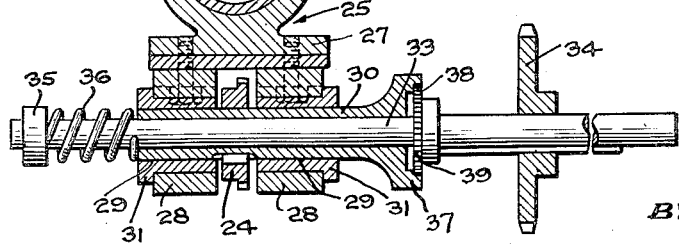
INVENTOR
JAMES C. CARLIN
BY Leon Edelson
ATTORNEY Nov. 14, 1950  J. C. CARLIN  2,529,593
LENGTH-MARKING APPARATUS
Filed July 9, 1946  3 Sheets-Sheet 3
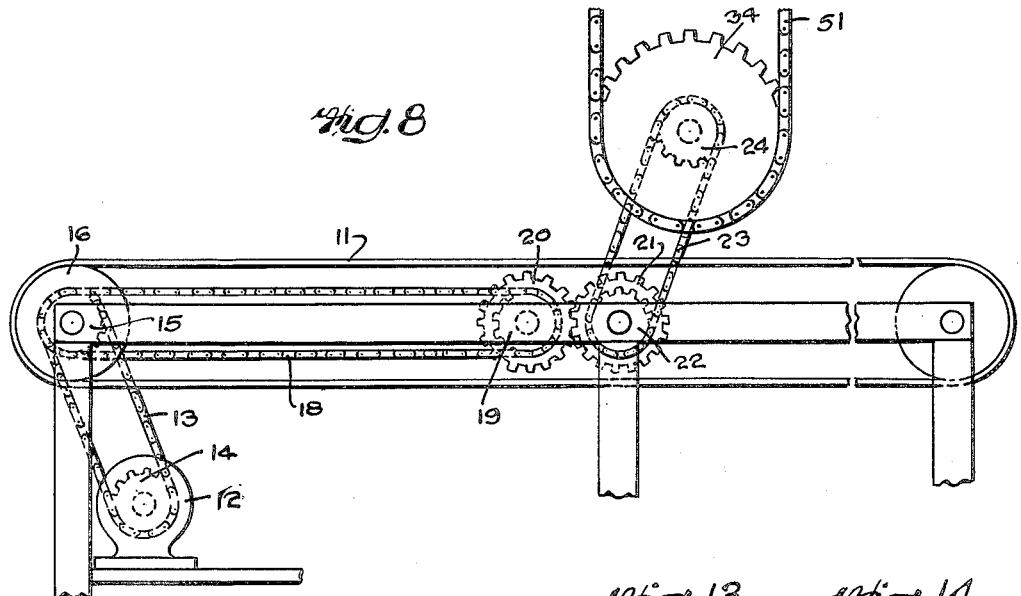
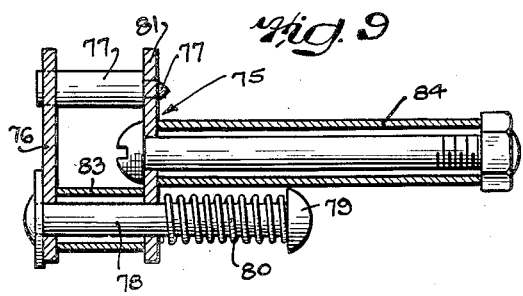
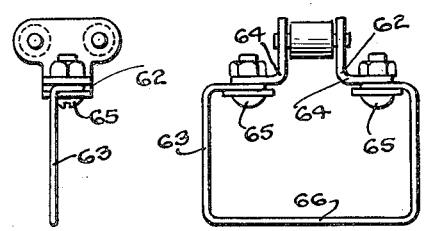
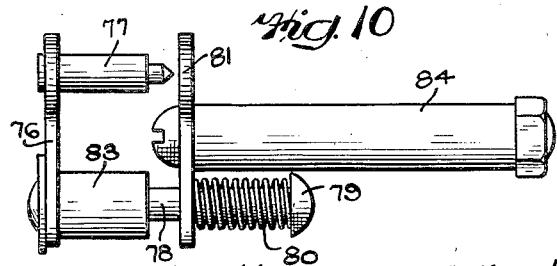
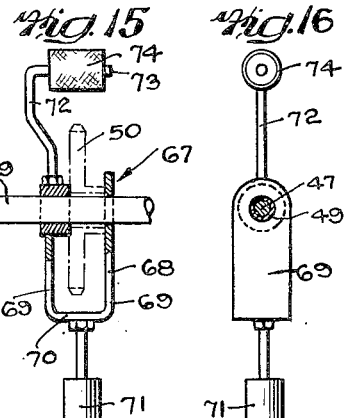
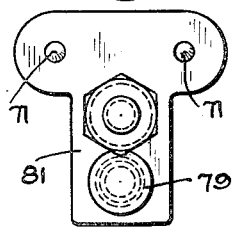
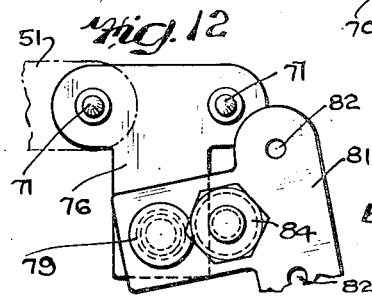
INVENTOR
JAMES C. CARLIN
BY Leo Edelson
ATTORNEY Patented Nov. 14, 1950

2,529,593

UNITED STATES PATENT OFFICE 2,529,593

LENGTH-MARKING APPARATUS

James C. Carlin, Norristown, Pa., assignor to Lee Rubber & Tire Corporation, Conshohocken, Pa., a corporation of New York Application July 9, 1946, Serial No. 682,247

2 Claims. (Cl. 91—12)

This invention relates generally to tire manufacture and more particularly to an improved apparatus for impressing upon a length of tire fabric moving upon a conveyor therefore a visible mark to indicate the line of severance of the fabric and so control with accuracy and speed the predetermined lengths of the fabric which are removed from the conveyor at its delivery end.

As is well known in tire manufacture, the tire core is largely built of several plies of rubber impregnated fabric hereafter referred to as ply fabric, tire fabric or tire cord fabric, such fabric being produced upon a calender which impregnates fabric, such as cord fabric, with the requisite amount of rubber. This rubber impregnated fabric is thereafter bias cut into strips of predetermined widths, the strips of a given width for use in the building of a particular size of tire core being then cut to such length that when it is placed about the tire building drum the ends of the strips slightly overlap. It is of course necessary that all corresponding strips of the tire fabric to be used in the manufacture of a tire of a particular size should be of the same length in order to insure proper overlap of its ends when the strip is wrapped around the tire building drum, it being among the principal objects of the present invention to provide an apparatus which conveniently and accurately measures the lengths of the strips to be severed from the continuous web of bias cut fabric, thus insuring that all corresponding strips of the bias cut fabric are of uniform lengths.

A further important object of the present invention is to provide an apparatus which is automatically operative, as the bias cut fabric is moved by its conveyor in the direction of its length, to impress thereon at uniform intervals a visible mark which determines for the operator the point at which the strip is to be severed, the apparatus being so arranged that with simple adjustment thereof the marking interval may be shortened or lengthened, as desired, to correspondingly shorten or lengthen the distance between the marks successively applied to the fabric. Thus, once the apparatus of the present invention is adjusted to mark off a given length of strip to be severed from the fabric, upon operation of the apparatus and delivery of the fabric therethrough, the fabric will be accurately, rapidly and conveniently marked for severance thereof into strips of predeterminedly fixed, uniform lengths.

Still another object of the invention is the provision of an apparatus which is fully automatic in operation, thus requiring a minimum of operator attention; which increases the speed of production of tire fabric strips far beyond the speed possible under conventional operating conditions; and which insures the production of strips more uniformly cut to accurate length, thereby reducing materially the number of strips which would have to be rejected due to non-standard lengths.

Other objects and advantages of the invention relating to details of construction and operation, such as the provision of readily adjustable means for setting the apparatus to mark off whatever length strip is desired to be produced, as well as the applicability of the apparatus for measuring off tire fabric strips of predetermined uniform length without regard to the width or thickness of the fabric, will appear more fully hereinafter.

The present invention consists generally in the combination, construction, location and relative arrangement of parts, all as will be described hereinafter, as shown in the accompanying drawings, and as finally pointed out in the appended claims. While the drawings illustrate an apparatus particularly adapted to the marking of tire fabric strips, it is to be understood that the apparatus constructed in accordance with and embodying the principles of the present invention is equally applicable for use in marking any fabric at spaced points in the length thereof to facilitate its accurate severance into shorter strips of predetermined uniform lengths.

In the accompanying drawings, which illustrate preferred embodiments of the present invention—

Figure 1 is a front elevational view, partly in section, showing the apparatus as constructed in accordance with and embodying the principles of the present invention;

Figure 2 is a side elevational view thereof;

Figure 3 is a top plan view of the conveyor and parts immediately associated therewith taken substantially on the line 3—3 of Figure 1;

Figure 4 is a sectional view taken on the line 4—4 of Figure 1;

Figure 5 is a sectional view taken on the line 5—5 of Figure 1;

Figures 6 and 7 are views respectively showing the sprocket chains altered for length as desired;

Figure 8 is a view of the forward portion of the conveyor showing the drive for the marking mechanism and conveyor;

Figure 9 is a sectional view on an enlarged scale, of the connector for the drive chain of the marking mechanism;

Figure 10 is a side elevational view of said connector;

Figures 11 and 12 are end views of the connector respectively showing the same in locked and unlocked conditions;

Figure 13 is an edge view, on an enlarged scale of the marking element;

Figure 14 is a front view of said marking element;

Figure 15 is a part view of the inking device; and

Figure 16 is an edge view thereof.

Referring now to the drawings and more particularly to Figures 1 to 3 thereof, it will be observed that the apparatus of the present invention generally includes an elevated main supporting frame 10 upon which is suitably mounted an endless belt conveyor 11 which is adapted to be operated by any suitable prime mover, such as an electric motor 12. Preferably, the conveyor belt 11 is so arranged that the upper section thereof travels in a horizontal plane spaced slightly above its supporting frame 10, the belt moreover being of a length sufficient to accommodate upon the upper horizontal surface thereof a web of ply fabric of sufficient length to permit the carrying out of the operations hereinafter described. Preferably although not necessarily, the fabric-supporting surface of the conveyor should be of greater length than the maximum length of ply strip which is to be severed from the web. It will be understood that the material which is to be marked to length for subsequent severance at the points of the severance marks impressed thereon is delivered to the conveyor 11 in any suitable manner and by any suitable means for transfer through the marking mechanism, and that the conveyor 11 may be continuously or intermittently operated at any desired linear speed to vary the output of the apparatus.

The material shown in the drawing and designated by the reference character A is what is known as bias cut cord fabric consisting of parallel cords impregnated with rubber, the cords extending at an angle with respect to the length of the fabric strip. Such fabric is readily severed by tearing the same along any line disposed between the parallel cords to produce a strip of any desired length, it being the function of the present apparatus to accurately mark upon the fabric margin the points at which each such tear should be made. Obviously, the present apparatus is not limited to the marking of bias-cut cord fabric but may be employed to mark upon any kind or type of fabric the points of severance or cutting to insure the production of predeterminedly fixed, uniform lengths of the fabric.

The conveyor 11 is driven by the motor 12 through a chain drive 13 operating upon the sprockets 14 and 15 respectively keyed to the shaft of the motor and to the shaft of the front drive roll 16 of the conveyor belt. Also keyed to the shaft of the conveyor drive roll 16 is a second sprocket which is coupled by a chain 18 to a sprocket 19 journalled on the conveyor frame, the sprocket 19 having associated therewith a gear 20 which is in constant meshed engagement with a second gear 21 suitably journalled on the conveyor frame.

The gear 21 which is thus driven by the gear 20, is associated with a sprocket 22 which is connected by the drive chain 23 to an elevated sprocket 24 disposed above and to one side of the conveyor 11, said last mentioned sprocket 24 and its associated parts to be presently described being supported by a bracket assembly 25, adjustably secured by the set screws 26—26, upon a vertically extending standard or post 25a, disposed in close proximity to one side of the conveyor 11. This bracket assembly 25 is most clearly shown in Figure 5 wherein it will be noted that the forward face of the bracket member 27 supports a pair of laterally spaced journal blocks 28—28 through the alined bores 29—29 of which is rotatably journalled a tubular sleeve member 30, this sleeve member being suitably restrained against axial movement, as by the members 31—31 fixedly secured to the sleeve for rotation therewith within the journal blocks 28—28.

Suitably keyed to the sleeve 30, as at 32, is the sprocket 24, this sprocket being disposed between the laterally spaced journal blocks 28—28 for the sleeve 30. An axially slidable shaft 33 extends through the sleeve 30 and is fitted at one end thereof with a chain drive sprocket 34 and at its opposite end with an enlarged abutment 35 for a coiled compression spring 36 embracing the shaft 33 between said abutment 35 and the adjacent end of the sleeve 30. The opposite end of the sleeve 30 adjacent the chain drive sprocket 34 is enlarged, as at 37, to provide an internal gear 38 which is adapted to mesh with an external gear 39 formed on the shaft 33. The normal bias of the compression spring 36 is such that it draws the shaft 33 axially through its supporting sleeve to effect and operatively maintain such coupling of the gears 38 and 39 that upon rotation of the sleeve 30 corresponding rotation is imparted to the shaft 33. To disengage the clutch gears 38 and 39 from one another, it is merely necessary to push the shaft 33 axially against the normal bias of the compression spring 36 whereupon the shaft may be freely rotated relatively to the sleeve 30 to effect such adjustments of the apparatus as may be desired, as, for example, to locate the marker at any desired starting point.

Secured to the standard or post 25a is a vertically extending elongated toothed rack 40 in engagement with which is a gear 41 included as part of an upper bracket assembly 42, spaced vertically above the lower bracket assembly 25. This upper bracket assembly, which is most clearly shown in Figure 4, generally includes a pair of bracket plates 43—43 which embrace opposite sides of the rack 40 and are secured together at their rear edges by transverse bolts 44—44 extending through a spacer block 45 in slidable contact with the rear edge of the rack 40. The inner faces of the plates 43—43 are normally spaced from the opposite sides of the rack (see Figure 5) and said plates extend forwardly of the rack to constitute in effect a channel the base wall of which is formed by the toothed surface of the rack.

The plates 43—43 are respectively provided with apertured bosses 46—46 which serve as laterally spaced journals for an upper sprocket shaft 47 paralleling the lower sprocket shaft 33, said shafts being disposed in a common vertical plane. Keyed to the upper shaft 47 between the plates 43—43 is the gear 41 serving conjointly with the spacer block 45 to maintain the assembly 42 at all times in operative association with the rack 40. The general arrangement is such that the assembly 42 may be shifted vertically along the rack 40 to raise or lower the assembly and so vary the effective distance between the upper shaft sprocket 47 and the lower sprocket shaft 33.

Embracing the major portion of the freely extending portion of the upper shaft 47 is a sleeve 49 upon which is rotatably journalled the upper sprocket 50, this upper sprocket being connected to the lower sprocket 34 by a sprocket chain 51. The outer end of the upper shaft 47 extends somewhat beyond the corresponding outer end of the sleeve 49 and is threaded, as at 52, for reception of a lock nut 53 preferably equipped with a locking handle 54. The terminal end of the shaft 47 is reduced, as at 55, and is fitted with a hand wheel 56 by means of which the shaft 47 may be rotated to roll the gear 48 in one direction or the other along the rack 40. The end of the shaft 47 opposite the hand-wheel extremity thereof is fitted with a stop 57 which abuts the outer end of the adjacent face plate 43, it being apparent that when it is desired to lock the upper assembly 42 in adjusted position along the vertical rack 40 it is merely necessary to actuate the lock nut 53 to exert a pressure on opposite sides of the face plates 43—43 sufficient to clamp the gear 48 therebetween and so restrain it from rotation. Upon so locking the gear against rotation, the assembly 42 is immovably held in any adjusted position along the rack 40. The face plates 43—43 inherently have sufficient spring to effect such clamping engagement against opposite sides of the gear 48 and when the lock nut 53 is released, the face plates spring apart to free the gear for rotation in either direction through manipulation of the hand wheel 56. Thus, any desired spacing between the sprockets 34 and 50 may be obtained for use with varying lengths of the sprocket chain 51.

In order to counterbalance the weight of the upper assembly 42 and the length of the sprocket chain 51 associated therewith, it is desirable to employ a counterbalancing weight 58 suspended from the free end of a cable 59 which is secured, as at 60, to the assembly 42 and extends over a pair of sheaves 61—61 mounted upon the top of the post 25ᵃ.

As most clearly appears in Figure 1, the upper and lower sprockets 34 and 50 and their associated sprocket chain 51 are arranged for operation in a vertical plane extending lengthwise of the conveyor 11, this plane of operation being located just within one side of the conveyor so as to present the chain 51 approximately above one edge of the ply fabric A supported on the conveyor. Carried by the chain 51 is a marking device 62 of the form best shown in Figures 1, 2, 13 and 14, this device consisting essentially of a wire bail or loop 63 suitably mounted, as by the members 64—64 and bolts 65—65, upon the chain 51 so that the cross bar 66 of the bail extends transversely of and is outwardly spaced from the chain. The mounting of the marking bail 63 upon the chain is such that while it does not interfere with the free movement of the chain about its sprockets 34 and 50, its cross bar 66 contacts the marginal edge of the ply fabric A disposed on the conveyor once for each complete cycle of travel of the chain, such contact being best shown in Figures 1 and 2. By adjusting the position of the lower bracket assembly 25 upon its supporting post 25ᵃ, the position of the marking bar 66 with relation to the surface of the ply fabric may be varied to compensate for any variations in thickness of said fabric.

Pivotally mounted upon the upper sleeve 49 in embracing relation with respect to the upper sprocket 50 is an inking device 67 essentially consisting of a U-shaped member 68 having a pair of arms 69—69 respectively disposed to either side of the sprocket 50, the lower ends of these arms being connected by a transverse cross-arm 70 spaced below the sprocket 50. The upper ends of the arms 69—69 are pivoted upon the sleeve, while the cross arm 70 is weighted, as by the depending weight 71, to normally maintain the device 67 in its upright position shown best in Figures 1, 15 and 16. Extending upwardly from the pivoted member 68 is an arm 72 terminating in a transverse extension 73 upon which is rotatably journalled an inking roll 74 of any suitable construction, preferably in the form of a cylindrical element having its surface covered with a resilient material, such as fabric, capable of retaining an ink which is transferred therefrom to the cross-bar 66 of the marking device 62 each time said cross-bar contacts the surface of inking roll. To this end, the inking roll is so spaced above the sprocket 50 that as the sprocket chain 51 moves in its orbit the cross-bar 66 of the marking device contacts the inking roll to receive a coating of ink which is subsequently transferred by the cross-bar to the fabric A at the point where it is engaged by the cross-bar. Thus, for each cycle of operation of the chain 51, the marking device is inked by the inking roll 74 and in turn impresses upon the fabric A an ink mark to indicate the point of severance of the predetermined length of strip from the fabric carried upon the conveyor through the marking mechanism.

Obviously, by varying the length of the chain the spacing between the successive marks impressed upon the fabric A may be changed as desired. In the manufacture of cord fabric plies for vehicle tires the length of the ply strip may vary from 55 inches to 90" and consequently in the production of such strips the length of the chain 51 may be changed to space the impressed marks on the fabric any desired distance apart. To facilitate such change in the length of the chain 51, the present invention contemplates the use of a chain coupling member 75 (see Figures 9 to 12 inclusive) consisting essentially of a T-shaped plate 76 from the head of which extends a pair of laterally spaced parallel pins 77—77 adapted respectively to project through the end openings of the conventional sprocket chain links to be connected together. The bottom end of the plate 76 is provided with a fixed laterally extending elongated pin 78 the outer end of which is headed, as at 79, to serve as the outer abutment for a coiled compression spring 80 embracing the shank of the pin 78. Loosely carried by the pin 78 is a plate 81 of a shape corresponding to the plate 76, this plate 81 being provided with a pair of laterally spaced apertures 82—82 respectively adapted to receive the free ends of the fixed pins 77—77. The plate 81 is interposed between the spring 80 and a tubular bushing 83 fitted on the elongated pin 78 so that it is normally maintained in registry with the fixed plate 76 as shown in Figure 11 with the pins 77—77 of the latter projecting through the apertures 82—82 of the plate 81. In such condition, the plates 76 and 81 respectively embrace the opposite sides of the chain end links to be coupled together with the coupling 75 constituting an intermediate coupling line of the chain.

In order to break open the chain, either for the purpose of removing or adding links to shorten or increase its effective length or of removing the chain from its sprockets 34 and 50, it is merely necessary to retract the plate 81 against the restraining influence of the spring 80 and then rotate it out of registry with the plate 76 (see Figure 12) whereupon the adjacent ends of the chain may be separated. To facilitate separation of the plates 76 and 81, the latter is provided with a handle 84 extending laterally from one side thereof. Figure 6 illustrates the use of the coupling 75 in the case of a relatively short chain, while Figure 7 illustrates the use of a pair of coupling members in the formation of a relatively long chain. Of course, any other suitable coupling device may be employed in lieu of that herein shown and described.

In the operation of the present apparatus, the web A of fabric from which the strips of predetermined length are to be severed is fed on to the conveyor 11 with one edge thereof disposed immediately beneath the vertical plane of travel of the length-measuring chain 51. The direction of travel of said chain 51 is such that the marker 62 carried thereby, while traversing an arc tangential to the web A, moves in the same direction as the web. By proper coordination of the interconnected elements of the drive from the motor to the sprocket 34, the linear speed of the chain 51 is maintained equal to that of the belt conveyor 11, in consequence of which the marker 62 successively impresses upon the marginal edge of the web A a series of severance marks which are spaced apart a distance exactly equal to the effective length of the chain. By severing the web A at each such mark, strips of the fabric of predeterminedly fixed, uniform length are obtained.

Should it be desired to vary the spacing of the impressed marks, it is merely necessary to change the effective length of the chain 51, this being readily accomplished by loosening the lock nut 53 on the shaft 47 to permit shifting of the gear 41 downwardly along the rack 40 through manipulating of the hand wheel 56. The upper sprocket 50 is thus shifted toward the lower sprocket 34 and so provides the chain 51 with sufficient slack to permit it to be uncoupled for subsequent insertion or removal of as many links as may be necessary for its desired effective length. Thereupon, the upper sprocket 50, by means of the hand-wheel 56 operating upon the gear 41, is shifted along the rack 40 to tighten the chain about its upper and lower sprockets.

Should it be found that upon adjustment of the chain 51 to provide for any given length thereof the marker element 62 is not in proper starting position, i. e., in contact with the web A as shown in Figures 1 and 2, it is merely necessary to disengage the clutch gears 38 and 39 by shifting the shaft 33 axially against the restraining bias of the spring 36. When clutch gears are so disengaged, the chain 51 is free to be shifted independently of the sleeve 30 and its associated driving sprocket 24, and it thus becomes a simple matter to manually adjust the chain to present the marker 62 in its proper starting position as shown in Figures 1 and 2.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed as new and useful is:

1. Length-marking apparatus for impressing upon a moving web of material a series of marks respectively designating points of severance of the web into strips of predeterminedly fixed uniform length comprising a conveyor for the moving web of material; and a web-marking mechanism comprising a vertical post disposed at the side of said conveyor, a pair of vertically spaced parallel transversely disposed shafts disposed over the conveyor, a bracket assembly for the lower of said shafts slidably carried by said post and having means for fixing the bracket and shaft in any desired vertical position on said post, a rack mounted on the post, a second assembly having a pinion engaging said rack for movably supporting the upper of said shafts on the rack, each shaft having a sprocket wheel mounted thereon near its free end and over the conveyor, said wheels being disposed in a vertical plane, an endless sprocket chain carried by said wheels, an outwardly directed marker carried by said chain, an inker for said marker carried by said upper shaft spaced from the wheel for inking the marker as it passes between the inker and the wheel, and single drive means for the conveyor and sprocket chain.

2. The apparatus set forth in claim 1 in which a counterbalance weight is attached to the upper bracket assembly.

JAMES C. CARLIN.

REFERENCES CITED

The following references are of record in the file of this patent:

UNITED STATES PATENTS

| Number | Name | Date |
|---|---|---|
| 553,032 | Kenna | Jan. 14, 1896 |
| 736,676 | Blaubach | Aug. 18, 1903 |
| 1,456,763 | Chapman et al. | May 29, 1923 |
| 1,713,750 | Dow | May 21, 1929 |
| 1,752,454 | Overbury | Apr. 1, 1930 |
| 2,268,876 | Kagley | Jan. 6, 1942 |